Aug. 25, 1931.    N. P. McLEOD    1,820,148
FLUID CONTROLLED CURTAIN
Filed March 22, 1930    2 Sheets-Sheet 1

INVENTOR
Neil P. Mc.Leod
Smith + Tuck
ATTORNEYS

Aug. 25, 1931.   N. P. McLEOD   1,820,148
FLUID CONTROLLED CURTAIN
Filed March 22, 1930   2 Sheets-Sheet 2
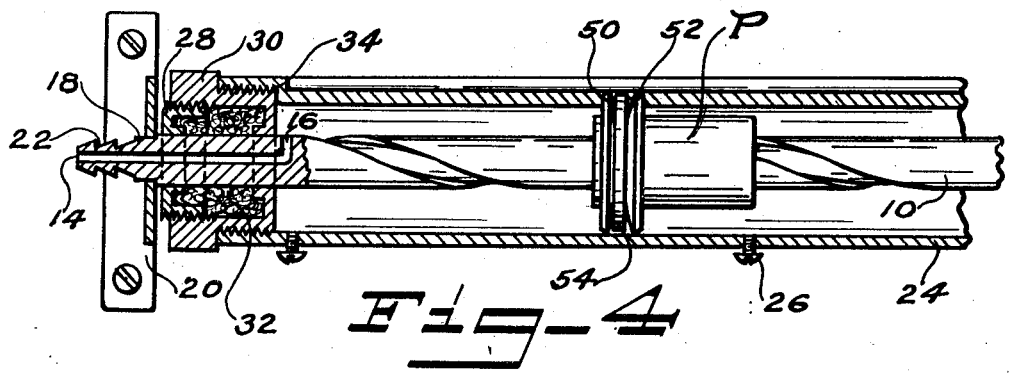
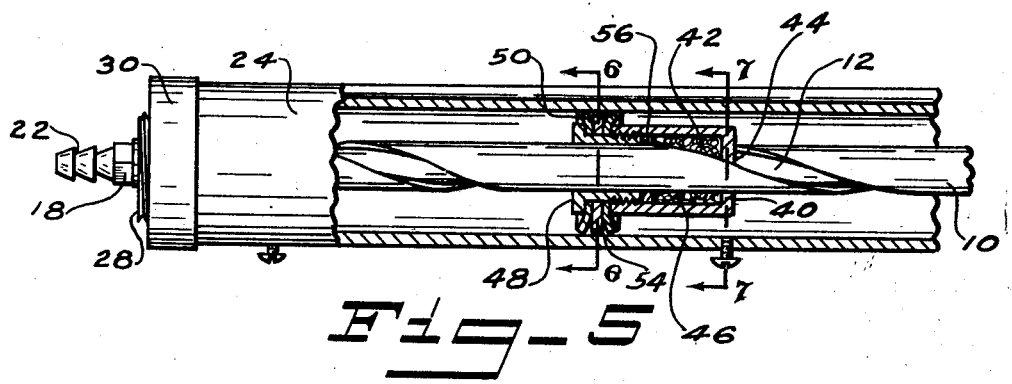
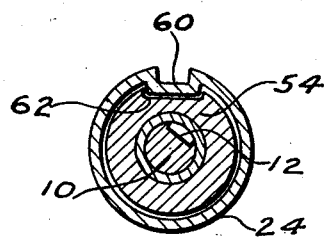
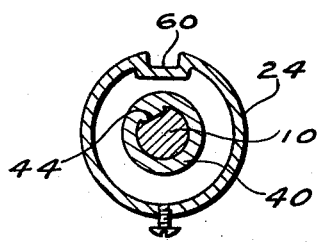
INVENTOR
Neil P. McLeod
BY
Smith & Tuck
ATTORNEYS Patented Aug. 25, 1931

1,820,148

UNITED STATES PATENT OFFICE

NEIL P. McLEOD, OF SEATTLE, WASHINGTON

FLUID CONTROLLED CURTAIN

Application filed March 22, 1930. Serial No. 437,969.

My present invention relates to the automotive accessory art and more particularly to a fluid controlled curtain for use on the rear window of an automobile. I mention specific use for my invention, although I believe it will be apparent that my device might be used under any conditions where fluid pressure is available.

In driving an automobile the average motorist has a rear vision mirror installed in such a position that the line of vision will be through the rear window. It often happens that when driving at night or sometimes in daylight hours that the glare from behind will be reflected in the rear view mirror or from the windshield glass itself producing a decided glare that makes driving unpleasant and at times dangerous. In driving a car with a rear seat it is not possible for the driver to operate the curtain for the rear window, which is provided to lessen this undesirable condition. It is not desirable to pull the curtain down completely as quite often it is very essential that the driver can see what is behind him. It is to overcome this deficiency of the present equipment that I have provided my fluid operated curtain, therefore:

The principal object of my invention is to provide a curtain roller that may be operated from the driver's seat.

A further object is to provide a curtain roller by means of which the curtain may be placed at any intermediate point between the up or down position and be maintained there.

A further object is to provide a curtain operating device which may be operated by a fluid under pressure.

Other and more specific objects will be apparent from the following description taken in connection with the accompanying drawings, wherein:

Figure 4 is a typical longitudinal section through either end of my device.

Figure 5 is a longitudinal sectional view showing my piston in section.

Figure 6 is a cross-sectional view along the line 6—6 of Figure 5.

Figure 7 is a cross-sectional view along line 7—7 of Figure 5.

Figure 8 is an elevation showing a small washer which is inside my piston and which rests upon the spindle.

Figure 1:
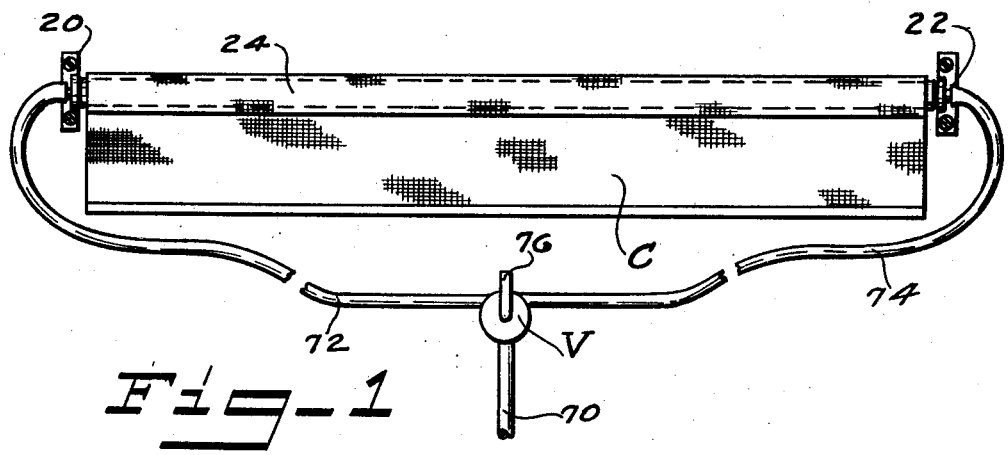
Figure 1 represents an elevation of my device as it appears in position for use. The hose lines are broken so as to bring the operating control valve into the same figure.
Figure 2:
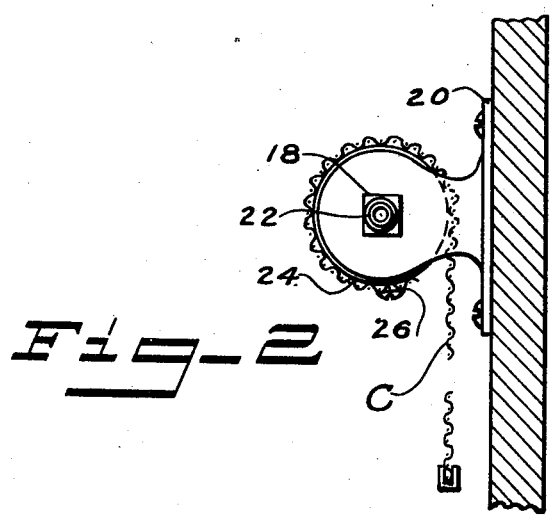
Figure 2 is an end view of my curtain roller.
Figure 3:
Figure 3 is a view showing the central spindle of my device.

Referring to the drawings throughout which like reference numerals indicate like parts numeral 10 represents the central spindle of my device. On this is cut a single spiral groove 12. Each end is preferably finished as indicated more clearly in Figure 4 wherein a fluid passage 14 is provided which terminates in a discharge opening 16.

A portion is formed as a square seat at 18 to accommodate a corresponding square hole in the supporting bracket 20. I prefer to finish the end of spindle 10 with one or more annular grooves 22 to make the attachment of a rubber tube thereto more secure.

Encircling spindle 10 is a round, preferably metal tube 24 to which a curtain "C" is attached by any convenient means as by gluing or the screws 26.

Tube 24 is supported from spindle 10 by the gland member 28 and the tube closing member 30.

Member 30 is preferably screwed into the end of tube 24 and gland member 28 is then screwed or pressed into member 30. This construction enables me to compress within the chamber 32 provided, suitable packing 34.

I have found this packing quite desirable as it prevents any leakage at this point. It will be understood that each end of my roller will normally have an identical construction.

Slidably secured to spindle 10 is a floating piston "P" which may be of any suitable type. The form shown has proven very satisfactory and consists of a housing member 40 which provides a packing chamber 42, and has suitably positioned the inwardly extending tongue member 44 which is of such a size as to slidably engage the groove 12. This serves a dual function, one being to cause the piston "P" to revolve as it slides along spindle 10, the other purpose is to retain the packing 46 in position and prevent it being squeezed out through groove 12.

Adjustably engaging member 40, as by the threads indicated, is a gland nut 48. This serves to compress packing 46 and also to bind and secure in position the two flexible washers 50 and 52 and the solid key washer 54. An additional small washer 56 is provided having an inwardly extending tongue 58 whose purpose is to prevent packing 46 being forced along groove 12.

The flexible washers 50 and 52 may be of metal, leather or composition and serve as packing or obturation of washers. The solid washer 54, which is more clearly illustrated in Figure 6, is adapted to engage a key-like depression 60, in tube 24, and to accomplish this has a notch 62 cut therein. As this washer 54 is securely clamped to piston "P" it is the power transferring member between spindle 10 and tube 24.

Method of operation

In operating my device a tube either metal or composition 70 is connected to a source of pressure. This may be either a positive or negative pressure, although it is intended normally for use with negative pressure as that is all that is normally available on an automobile. If positive pressure were available, however, it would operate the device equally as well except in the reversed direction. The other end of tube 70 is connected to any type of three-way valve "V".

From valve "V" a tube is led to each end of my device as 72 and 74 respectively. These tubes communicate with the passageway 14 in each end of spindle 10 and are thus able to supply pressure to either side of piston "P". If it is desired to raise the curtain for instance when it is in its lower-most position, the valve handle 76 which should be placed normally in a position convenient to the driver, is turned to a position which will admit pressure to one side or the other of piston "P". The piston will then move toward the side of least pressure sliding upon spindle 10.

Due to the action of tongue 44 the piston must revolve as it slides along the spindle, further, due to the action of washer 54 and its co-acting key 60, tube 24 will turn with piston P and thus roll up or unroll according to the direction of the action of the curtain attached to the tube.

I believe it will be understood that there must be one turn of groove 12 on spindle 10 for each revolution it is desired to turn tube 24.

I have found that ordinarily the rear windows of automobiles are quite shallow and usually from three to five turns will suffice to completely cover or uncover the window.

I prefer, therefore, to distribute the turns of groove 12 throughout the available length of spindle 10. In this way I keep the angle of groove 12 at a minimum and thus give a greater advantage to piston "P".

I believe it will be clearly understood that by the setting of handle 76 in an intermediate position while raising or lowering the curtain that the curtain can come to rest and be held at any desired position.

The foregoing description and the accompanying drawings clearly disclose a preferred embodiment of my invention but it will be understood that this disclosure is merely illustrative and that such changes in the invention may be made as are fairly within the scope and spirit of the following claim:

What I claim is:

A fluid controlled curtain consisting of a fixed central spindle having a spiral groove thereon; supporting bracket for said spindle; said spindle having each end formed with a fluid passage, a discharge opening and a short flat sided bracket engaging portion adapted to secure said spindle against rotation; end portions for said spindle adapted to receive a suction hose; a revolvable curtain receiving tube disposed concentric with said spindle; packing, retaining and compressing means at each end of said tube; a deformation of said tube extending longitudinally thereof; a curtain secured at one end, to said tube; a piston adapted to slide along said spindle; said piston consisting of, a housing member adapted to retain packing and also to engage the spindle groove in a manner to cause said piston to revolve as it slides along said spindle, a plurality of flexible washers adapted to engage the inner surface of said tube, a washer retaining gland nut and a washer secured to said piston having thereon means adapted to engage a deformed portion of said tube and causing the same to revolve with said piston, and means for supplying suitable fluid pressure to said piston to cause it to slide.

In witness whereof, I hereunto subscribe my name this 13th day of March, A. D. 1930.

NEIL P. McLEOD.